United States Patent
Ding et al.

(10) Patent No.: US 10,216,310 B2
(45) Date of Patent: Feb. 26, 2019

(54) PRESSURE-SENSITIVE PANEL AND DETECTION METHOD THEREOF, 3D TOUCH PANEL AND TOUCH DISPLAY PANEL

(71) Applicants: BOE Technology Group Co., Ltd., Beijing (CN); Beijing BOE Optoelectronics Technology Co., Ltd., Beijing (CN)

(72) Inventors: Xiaoliang Ding, Beijing (CN); Xue Dong, Beijing (CN); Xiaochuan Chen, Beijing (CN); Haisheng Wang, Beijing (CN); Yingming Liu, Beijing (CN); Wei Liu, Beijing (CN); Pengpeng Wang, Beijing (CN); Shengji Yang, Beijing (CN); Weijie Zhao, Beijing (CN); Tao Ren, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 57 days.

(21) Appl. No.: 15/329,933

(22) PCT Filed: Jul. 13, 2016

(86) PCT No.: PCT/CN2016/089908
§ 371 (c)(1),
(2) Date: Jan. 27, 2017

(87) PCT Pub. No.: WO2017/117962
PCT Pub. Date: Jul. 13, 2017

(65) Prior Publication Data
US 2018/0210596 A1    Jul. 26, 2018

(30) Foreign Application Priority Data
Jan. 5, 2016 (CN) .......................... 2016 1 0006895

(51) Int. Cl.
*G06F 3/041* (2006.01)
(52) U.S. Cl.
CPC ............ *G06F 3/0414* (2013.01); *G06F 3/041* (2013.01); *G06F 3/0412* (2013.01)
(58) Field of Classification Search
CPC ....... G06F 3/016; G06F 3/0412; G06F 3/0414
(Continued)

(56) References Cited

U.S. PATENT DOCUMENTS 4,766,666 A * 8/1988 Sugiyama ............. G01L 9/0042
                                                     29/454
5,590,908 A * 1/1997 Carr ......................... A63C 5/03
                                                   280/14.21
(Continued)

FOREIGN PATENT DOCUMENTS

CN     101699369 A    4/2010
CN     102467314 A    5/2012
(Continued)

OTHER PUBLICATIONS

Oct. 20, 2016—International Search Report and Written Opinion Appn PCT/CN2016/089908 with Eng Tran.
(Continued)

*Primary Examiner* — Mark Edwards
(74) *Attorney, Agent, or Firm* — Banner & Witcoff, Ltd.

(57) ABSTRACT

The present disclosure provides a pressure-sensitive panel and a detection method thereof, a 3D touch panel and a touch display panel. The pressure-sensitive panel includes a pressure-sensitive layer. The pressure-sensitive layer includes a plurality of pressure-sensitive units, and each pressure-sensitive unit includes four resistors, a first voltage detection unit and a second voltage detection unit. The four resistors of each pressure-sensitive unit are connected with each other in sequence; two short sides of the first resistor are respec-
(Continued)

tively connected with one long side of the second resistor and the fourth resistor; and two short sides of the third resistors are connected with the other long side of the second resistor and the fourth resistor. A connecting end between the first resistor and the fourth resistor is connected with a first fixed voltage end, and a connecting end between the second resistor and the third resistor is connected with a second fixed voltage end. The first voltage detection unit is connected with a connecting end between the first resistor and the second resistor, and the second voltage detection unit is connected with a connecting end between the third resistor and the fourth resistor. The pressure-sensitive panel can detect the pressing force of a user.

20 Claims, 6 Drawing Sheets

(58) Field of Classification Search
 USPC ............................................. 345/173
 See application file for complete search history.

(56) References Cited

U.S. PATENT DOCUMENTS

| | | |
|---|---|---|
| 2011/0115547 A1 | 5/2011 | Wang |
| 2011/0203390 A1 | 8/2011 | Tao et al. |
| 2015/0378483 A1 | 12/2015 | Tachikawa et al. |
| 2016/0048266 A1* | 2/2016 | Smith ................... G06F 3/0418 |
| | | 345/174 |
| 2017/0045989 A1* | 2/2017 | Lee ....................... G06F 3/0414 |

FOREIGN PATENT DOCUMENTS

| | | | |
|---|---|---|---|
| CN | 104969048 A | | 10/2015 |
| CN | 105117055 A | | 12/2015 |
| CN | 105117058 A | | 12/2015 |
| CN | 204883660 U | * | 12/2015 |
| CN | 204904241 U | | 12/2015 |
| CN | 105404432 A | | 3/2016 |
| CN | 205302244 U | | 6/2016 |
| KR | 20130104598 A | | 9/2013 |

OTHER PUBLICATIONS

Oct. 11, 2017—(CN) First Office Action Appn 201610006895.9 with English Tran.

* cited by examiner

PRESSURE-SENSITIVE PANEL AND DETECTION METHOD THEREOF, 3D TOUCH PANEL AND TOUCH DISPLAY PANEL

CROSS-REFERENCE TO RELATED APPLICATIONS

The application is a U.S. National Phase Entry of International Application No. PCT/CN2016/089908 filed on Jul. 13, 2016, designating the United States of America and claiming priority to Chinese Patent Application No. 201610006895.9, filed Jan 5, 2016. The present application claims priority to and the benefit of the above-identified applications and the above-identified applications are incorporated by reference herein in their entirety.

TECHNICAL FIELD

The present disclosure relates to the field of display technology, in particular to a pressure-sensitive panel and a detection method thereof, a 3D touch panel and a touch display panel.

BACKGROUND

The touch display panel generally comprises a display panel and a touch panel. In the manufacturing process of the touch display panel, the most basic proposal is that the display panel and the touch panel are respectively manufactured at first, and subsequently, the display panel and the touch panel are bonded to form the touch display panel. In addition, there are two proposals, on-cell and in-cell, as well. The on-cell proposal is that a touch circuit is formed on a surface of the display panel, so that the bonding process is not required, and hence the thickness of the touch display panel can be reduced compared with the proposal of bonding the display panel and the touch panel. Moreover, the in-cell proposal refers to that a touch circuit is formed in the display panel (for instance, between an array substrate and a color filter (CF) substrate), and the thickness of the touch display panel formed by the proposal is even smaller than that of the on-cell proposal.

The touch display panel manufactured by the plurality of proposals generally can only identify coordinates in the X direction and the Y direction, namely can only determine the position of the screen pressed by the user but cannot determine the pressing force of the user. Thus, limitation is brought to further development and application of touch operation.

SUMMARY (I) Technical Problems to be Solved

The present disclosure provides a pressure-sensitive panel and a detection method thereof, a 3D touch panel and a touch display panel in order to at least solve one of the technical problems in the prior art, which can detect the pressing force in the touch operation of the user and respond to corresponding operation, and hence achieve richer touch experience.

(II) Technical Solutions

In order to realize the objective of the disclosure, a pressure-sensitive panel is provided, which comprises: a pressure-sensitive layer formed on a substrate, wherein the pressure-sensitive layer includes a plurality of pressure-sensitive units distributed in various areas of the substrate; each pressure-sensitive unit includes two resistors and a first voltage detection unit; each of the two resistors is provided with a long axis and a short axis; in each pressure-sensitive unit, two short sides of the first resistor are respectively connected with a first fixed voltage end and one long side of the second resistor; the other long side of the second resistor is connected with a second fixed voltage end; and the first voltage detection unit is connected with a connecting end between the first resistor and the second resistor and configured to detect a voltage at the connecting end between the first resistor and the second resistor.

In a possible embodiment, the two resistors are elongated or elliptical.

In a possible embodiment, the second fixed voltage end is a ground terminal.

In a possible embodiment, a distribution density of the pressure-sensitive units along a direction from a central area to a marginal area of the substrate is progressively increased.

In a possible embodiment, the two resistors are made from indium tin oxide (ITO) or carbon nano-material.

The disclosure further provides a pressure detection method employing the pressure-sensitive panel as mentioned above, comprising:

detecting a voltage value between the two resistors of the pressure-sensitive unit and taking the voltage value as the first voltage value, upon the pressure-sensitive unit being not pressed;

detecting the voltage value between the two resistors and taking the voltage value as the second voltage value, upon the pressure-sensitive unit being pressed;

calculating a difference between the first voltage value and the second voltage value; and determining a pressing force of a user according to a corresponding relationship between the pressing force of the user and the difference between the first voltage value and the second voltage value.

The present disclosure provides a pressure-sensitive panel, comprising: a pressure-sensitive layer formed on a substrate, wherein the pressure-sensitive layer includes a plurality of pressure-sensitive units distributed in various areas of the substrate; each pressure-sensitive unit includes four resistors, a first voltage detection unit and a second voltage detection unit; each of the four resistors is provided with a long axis and a short axis; the four resistors of each pressure-sensitive unit are connected with each other in sequence; two short sides of the first resistor are respectively connected with one long side of the second resistor and the fourth resistor adjacent to the first resistor; two short sides of the third resistor opposite to the first resistor are respectively connected with the other long side of the second resistor and the fourth resistor; a connecting end between the first resistor and the fourth resistor is connected with a first fixed voltage end; a connecting end between the second resistor and the third resistor is connected with a second fixed voltage end; the first voltage detection unit is connected with a connecting end between the first resistor and the second resistor and configured to detect a voltage at the connecting end between the first resistor and the second resistor; and the second voltage detection unit is connected with a connecting end between the third resistor and the fourth resistor and configured to detect a voltage at the connecting end between the third resistor and the fourth resistor.

In a possible embodiment, the four resistors are elongated or elliptical.

In a possible embodiment, the second fixed voltage end is a ground terminal.

In a possible embodiment, a distribution density of the pressure-sensitive units along a direction from a central area to a marginal area of the substrate is progressively increased.

In a possible embodiment, the four resistors are made from ITO or carbon nano-material.

The present disclosure further provides a pressure detection method employing the pressure-sensitive panel as mentioned above, comprising:

detecting a voltage value between the first resistor and the second resistor of the pressure-sensitive unit and detecting a voltage value between the third resistor and the fourth resistor of the pressure-sensitive unit, upon the pressure-sensitive unit being not pressed;

calculating a difference between the detected voltage value between the first resistor and the second resistor and the detected voltage value between the third resistor and the fourth resistor, and taking the difference as a first voltage value;

detecting the voltage value between the first resistor and the second resistor of the pressure-sensitive unit and detecting the voltage value between the third resistor and the fourth resistor of the pressure-sensitive unit, upon the pressure-sensitive unit being pressed;

calculating a difference between the detected voltage value between the first resistor and the second resistor and the detected voltage value between the third resistor and the fourth resistor, and taking the difference as a second voltage value;

calculating the difference between the first voltage value and the second voltage value; and determining a pressing force of a user according to a corresponding relationship between the pressing force of the user and the difference between the first voltage value and the second voltage value.

The present disclosure further provides a 3D touch panel, comprising: the pressure-sensitive panel as mentioned above.

The present disclosure further provides touch display panel, comprising: the pressure-sensitive panel as mentioned above, or the 3D touch panel as mentioned above.

The present disclosure provides the following beneficial effects.

In the first pressure-sensitive panel provided by the embodiment of the present disclosure, in each pressure-sensitive unit, the first and second resistors are in series connection between the first fixed voltage end and the second fixed voltage end; the first resistor is connected between the first fixed voltage end and the second fixed voltage end via the long axes thereof and the second resistor is connected between the first fixed voltage end and the second fixed voltage end via the short axes thereof. Thus, when the pressure-sensitive unit is pressed by the user, the variation amplitude of the resistance of the first and second resistors is different, so that the voltage between the first and second resistors can change. Moreover, as the variation amplitude of the resistance is related to the pressing force of the user, the voltage between the first and second resistors is detected by the first voltage detection unit, and the pressing force of the user may be determined according to the variation of the voltage value between the first and second resistors before and after the pressure-sensitive unit is pressed by the user.

The pressure detection method employing the first pressure-sensitive panel, provided by the embodiment of the present disclosure, detects the voltage value between the first and second resistors according to the variation of the resistance generated by the deformation of the resistors in the pressure-sensitive unit before and after the pressing of the user, respectively obtains the first voltage value and the second voltage value, and can determine the pressing force of the user according to the corresponding relationship between the pressing force of the user and the difference between the first voltage value and the second voltage value.

In the second pressure-sensitive panel provided by the embodiment of the present disclosure, in each pressure-sensitive unit, two branches in parallel connection formed by the first and second resistors and the third and fourth resistors are connected between the first fixed voltage end and the second fixed voltage end. Moreover, in the branch provided with the first and second resistors, the first resistor is connected between the first fixed voltage end and the second fixed voltage end via the long axes thereof, and the second resistor are connected between the first fixed voltage end and the second fixed voltage end via the short axes thereof. In the branch provided with the third and fourth resistors, the third resistor is connected between the first fixed voltage end and the second fixed voltage end via the short axes thereof, and the fourth resistor is connected between the first fixed voltage end and the second fixed voltage end via the long axes thereof. Thus, when the pressure-sensitive unit is pressed by the user, the voltage value between the first and second resistors and the voltage value between the third and fourth resistors will change in different amplitudes, and the variation amplitude of the voltage value is relevant to the pressing force of the user. Therefore, the voltage between the first and second resistors is detected by the first voltage detection unit and the voltage between the third and fourth resistors is detected by the second voltage detection unit; the difference between both is calculated; and the pressing force of the user can be determined according to the variation of the difference before and after the pressure-sensitive unit is pressed by the user.

The pressure detection method employing the second pressure-sensitive panel, provided by the present disclosure, detects the voltage value between the first and second resistors and the voltage value between the third and fourth resistors before and after the pressing of the user according to the variation of the resistance generated by the deformation of the resistors in the pressure-sensitive unit before and after the pressing of the user, calculates the difference between the voltage value before and after the pressing of the user, respectively obtains the first voltage value and the second voltage value, and can determine the pressing force of the user according to the corresponding relationship between the pressing force of the user and the difference between the first voltage value and the second voltage value.

(III) Beneficial Effect

The embodiments of the present disclosure provide the following beneficial effects.

The touch display panel provided by the present disclosure adopts the 3D touch panel provided by the embodiment of the present disclosure or adopts the first or second pressure-sensitive panel provided by the present disclosure, can detect the pressing force of the user in touch operation and respond to corresponding operation according to the pressing force of the user, and hence can provide richer touch experience.

BRIEF DESCRIPTION OF THE DRAWINGS

For more clear understanding of the technical proposals in the embodiments of the present disclosure or the prior art, simple description will be given below to the accompanying drawings required to be used in the description of the embodiments. The drawings described below are only some embodiments of the present disclosure. Other drawings may also be obtained by those skilled in the art without creative efforts on the basis of the accompanying drawings.

REFERENCE NUMERALS OF THE ACCOMPANYING DRAWINGS

10: substrate; 11: pressure-sensitive layer; 12: pressure-sensitive unit; 20: array substrate; 21: counter substrate; 22: liquid crystal layer; 120: resistor; 121: first voltage detection unit; 122: second voltage detection unit.

DETAILED DESCRIPTION

Further description will be given below to the preferred embodiments of the present disclosure with reference to the accompanying drawings and the embodiments. The following embodiments are only used for illustrating the present disclosure but not intended to limit the scope of the present disclosure.

For more clear understanding of the objectives, the technical proposals and the advantages of the embodiments of the present disclosure, clear and complete description will be given below to the technical proposals of the embodiments of the present disclosure with reference to the accompanying drawings of the embodiments of the present disclosure. Obviously, the preferred embodiments are only partial embodiments of the present disclosure and not all the embodiments. All the other embodiments obtained by those skilled in the art on the basis of the preferred embodiments of the present disclosure shall fall within the scope of protection of the present disclosure.

Unless otherwise specified, the technical terms or scientific terms used herein have normal meanings understood by those skilled in the art. The words "first", "second" and the like used in the description and the claims of the patent application of the present disclosure do not indicate the sequence, the number or the importance but are only used for distinguishing different components. Similarly, the words "a", "an" and the like also do not indicate the number but only indicate at least one. The words "connection", "connected" and the like are not limited to physical or mechanical connection but may include electrical connection, either directly or indirectly. The words "on", "beneath", "left", "right" and the like only indicate the relative position relationship which is correspondingly changed when the absolute position of a described object is changed.

Detailed description will be given below to the preferred embodiments of the present disclosure with reference to the accompanying drawings. It should be understood that the preferred embodiments described here are only used for illustrating the present disclosure and not intended to limit the present disclosure.

Figure 1:
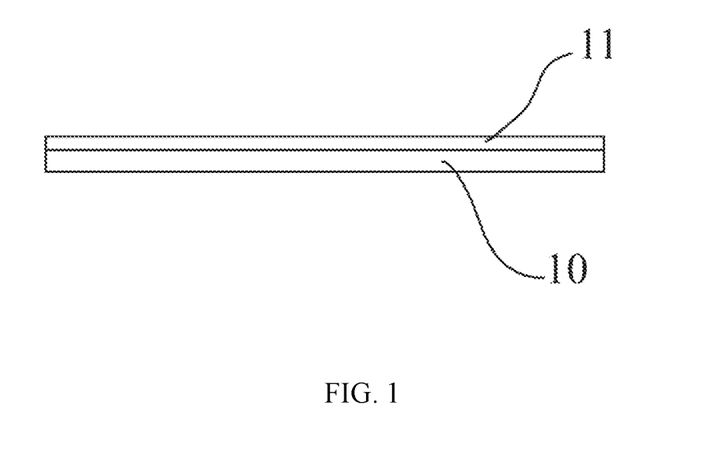
FIG. 1 is a schematic diagram of a first pressure-sensitive panel and a second pressure-sensitive panel provided by an embodiment of the present disclosure.
Figure 2:
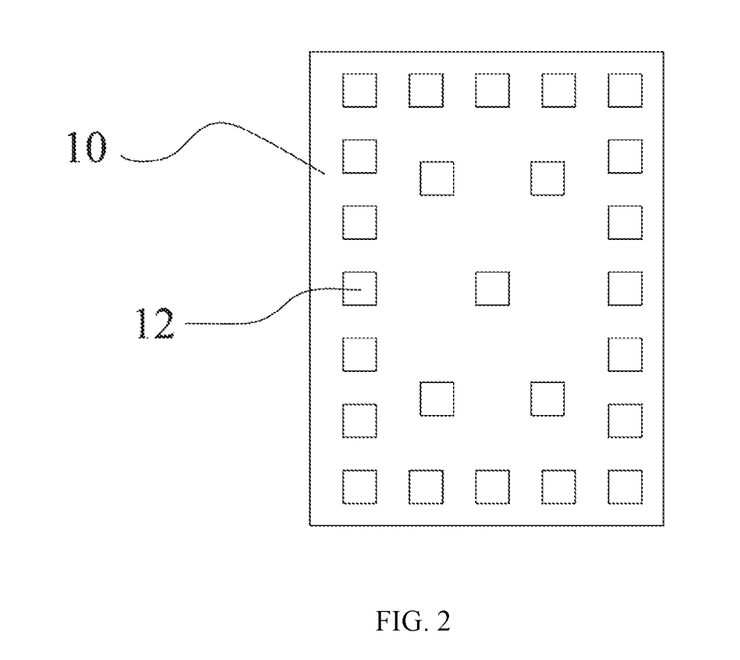
FIG. 2 is a schematic diagram of a pressure-sensitive layer in the first pressure-sensitive panel and the second pressure-sensitive panel provided by the embodiment of the present disclosure.
Figure 3:
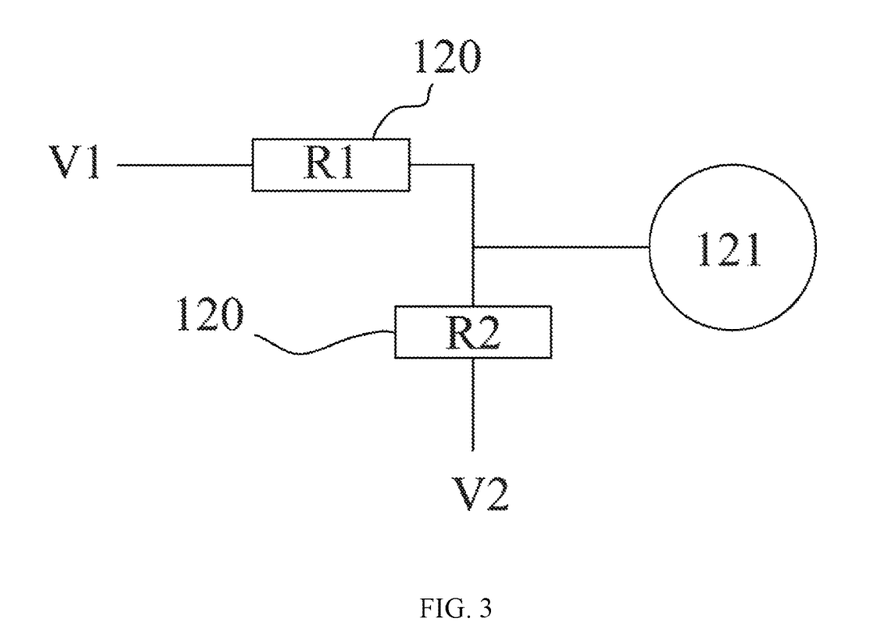
FIG. 3 is a schematic diagram of a pressure-sensitive unit in the first pressure-sensitive panel provided by the embodiment of the present disclosure.

The present disclosure provides a plurality of pressure-sensitive panels and provides preferred embodiments thereof. In the embodiment of a first pressure-sensitive panel, as illustrated in FIGS. 1 to 3, the pressure-sensitive panel comprises a pressure-sensitive layer 11 formed on a substrate 10. The pressure-sensitive layer 11 includes a plurality of pressure-sensitive units 12 distributed in various areas of the substrate 10. For instance, each pressure-sensitive unit 12 includes two resistors 120 and a first voltage detection unit 121. For instance, the two resistors 120 are completely the same, and each resistor 120 is provided with long axes and short axes. Specifically, the resistor 120 may be elongated or elliptical. As illustrated in FIG. 3, the resistor 120 is elongated; the long axis thereof is along a direction of the long side of the elongated shape; and the short axis is along a direction of the short side of the elongated shape.

Of course, it should be understood by those skilled in the art that the two resistors 120 may also be not completely the same. The present disclosure is not limited thereto.

As illustrated in FIG. 3, in each pressure-sensitive unit 12, two short sides of the first resistor 120 are respectively connected with a first fixed voltage end V1 and one long side of the second resistor 120, and the other long side of the second resistor 120 is connected with a second fixed voltage end V2. The voltage value of the first fixed voltage end V1 is V1, and the voltage value of the second fixed voltage end V2 is V2. The first voltage detection unit 121 is connected with a connecting end between the first resistor 120 and the second resistor 120 and configured to detect the voltage at the connecting end between both.

Detailed description will be given below to the working principle and the working process of the first pressure-sensitive panel provided by the embodiment of the present disclosure with reference to the accompanying drawings.

Figure 4:
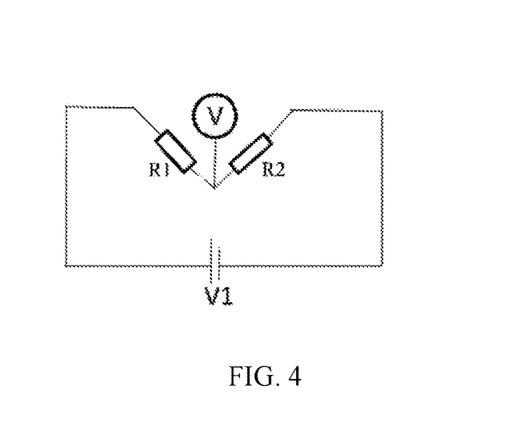
FIG. 4 is an equivalent circuit diagram of the pressure-sensitive unit as illustrated in FIG. 3 (when the second fixed voltage end is zero-voltage)

As illustrated in FIGS. 3 and 4, when the pressure-sensitive unit 12 is pressed by a user, each resistor 120 is deformed under the action of pressure, which is mainly displayed in that the long-axis direction of the resistor 120 will be longer (herein, the short-axis direction of the resistor 120 will also be deformed, but the deformation amplitude of the short-axis direction is less than the deformation amplitude of the long-axis direction). Thus, the resistance between the two short sides of the resistor 120 will be increased but the resistance between the two long sides will be reduced. Specifically, in the embodiment, the resistance of the first resistor 120 will be increased but the resistance of the second resistor 120 will be reduced.

Based on the above change, supposing that the voltage value V1 of the first fixed voltage end V1 is greater than the voltage value V2 of the second fixed voltage end V2, when the pressure-sensitive unit 12 is not pressed by the user, the voltage $V_{12}$ between the first and second resistors 120 detected by the first voltage detection unit 121 is:

$$V_{12} = \frac{R1}{R1+R2} \times (V1-V2) \quad (1)$$

wherein, R1 refers to the resistance of the first resistor 120 when the pressure-sensitive unit 12 is not pressed, and R2 refers to the resistance of the second resistor 120 when the pressure-sensitive unit 12 is not pressed.

When the pressure-sensitive unit 12 is pressed by the user, supposing that the resistance of the first resistor 120, which changes due to deformation, is converted into aR1, a>1, and the resistance of the second resistor 120, which changes due to deformation, is converted into bR2, b<1, the voltage $V_{12}'$ between the first and second resistors 120 detected by the first voltage detection unit 121 is converted into:

$$V_{12}' = \frac{aR1}{aR1+bR2} \times (V1-V2) \quad (2)$$

As a>1 and b<1, $V_{12}'>V_{12}$ may be determined according to the formula (2). In this case, when the pressing force of the user is larger, the deformation amplitude of the first and second resistors 120 is larger; a is larger and b is smaller; $V_{12}'$ is larger according to the formula (2); and hence the difference between $V_{12}'$ and $V_{12}$ is larger. When the pressing force of the user is smaller, the deformation amplitude of the first and second resistors 120 is smaller; a is smaller and b is larger; $V_{12}'$ is smaller according to the formula (2); and hence the difference between $V_{12}'$ and $V_{12}$ is smaller. Therefore, the value $V_{12}'-V_{12}$ may reflect the pressing force of the user, and hence the pressing force of the user may be determined according to the corresponding relationship between the pressing force of the user and the value $V_{12}'-V_{12}$.

Preferably, the second fixed voltage end V2 is a ground terminal, so that the second resistor 120 can be directly grounded, and an independent voltage terminal is not required to be provided. Thus, the number of voltage terminals required to be arranged can be reduced, and hence the circuit can be simpler in setting.

Generally, in the touch panel or the touch display panel employing the pressure-sensitive panel provided by the embodiment, marginal positions of the substrate 10 are fixed by a fixing member such as a frame, so that the pressure-sensitive panel can be fixed. Therefore, when the marginal position of the pressure-sensitive panel is pressed by the user, the deformation of the pressure-sensitive panel is relatively small; and when a central area of the pressure-sensitive panel is pressed by the user, the deformation of the pressure-sensitive panel is relatively large. In this case, in the embodiment, the distribution density of the pressure-sensitive unit 12 is progressively increased along the direction from the central area to the marginal area of the substrate 10. Thus, on one hand, the number of the arranged pressure-sensitive units 12 can be reduced; and on the other hand, as the deformation is large when the central area of the pressure-sensitive panel is pressed, the resistors in the pressure-sensitive unit 12 can also have enough deformation when less pressure-sensitive units 12 are arranged in the central area, so that the pressing force of the user can be determined.

In actual use, the deformation of the resistors 120 when pressed is also affected by temperature. In the embodiment, the distance between the resistors 120 in each pressure-sensitive unit 12 is closer, and the temperature difference of respective areas is small and generally may be ignored. Thus, the detection of the pressing force of the user by the pressure-sensitive unit in the embodiment is not affected by temperature. Therefore, the accuracy of the detection result can be higher. Moreover, when the pressing force of the user is detected, the influence of temperature may be ignored, so that the detection method and the detection process can be simpler.

In the embodiment, the substrate 10 is preferably a transparent substrate, and the resistor 120 is preferably a transparent resistor. Thus, when the pressure-sensitive panel is applied to the display panel, the resistors 120 not only may be disposed in a non-display area but also may be disposed in a pixel area for display, so that the distribution density of the pressure-sensitive units can be increased, and hence the accuracy of identifying the pressing force of the user can be improved. The resistors 120 may be specifically made from ITO or carbon nano-material.

In the first pressure-sensitive panel provided by the embodiment of the present disclosure, in each pressure-sensitive unit 12, the first and second resistors 120 are in series connection between the first fixed voltage end V1 and the second fixed voltage end V2; the first resistor 120 is connected between the first fixed voltage end V1 and the second fixed voltage end V2 via the long axes thereof; and the second resistor 120 is connected between the first fixed voltage end V1 and the second fixed voltage end V2 via the short axes thereof. Thus, when the pressure-sensitive unit 12 is pressed by the user, the variation amplitude of the resistance of the first and second resistors 120 is different, so that the voltage between the first and second resistors 120 can change. Moreover, as the variation amplitude of the resistance is related to the pressing force of the user, the voltage between the first and second resistors 120 is detected by the first voltage detection unit 121, and the pressing force of the user may be determined according to the variation of the voltage value between the first and second resistors 120 before and after the pressure-sensitive unit 12 is pressed by the user.

Figure 5:
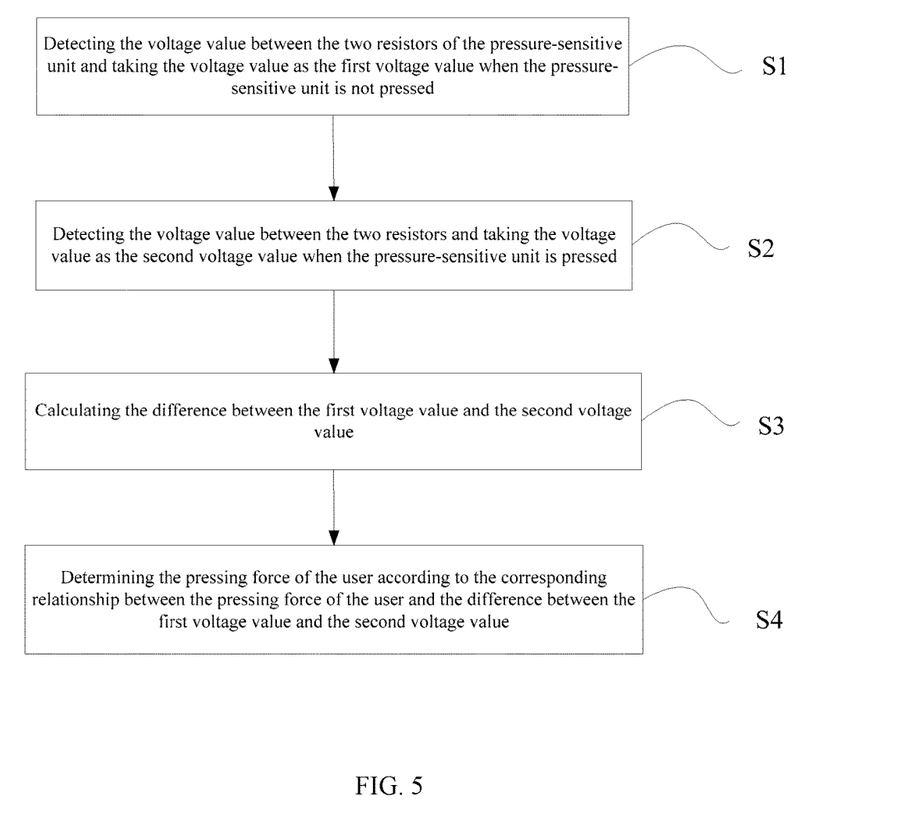
FIG. 5 is a flowchart of a pressure detection method employing the first pressure-sensitive panel provided by the embodiment of the present disclosure.

The embodiment of the present disclosure further provides a pressure detection method employing the first pressure-sensitive panel and provides preferred embodiments thereof. FIG. 5 is a flowchart of the pressure detection method employing the first pressure-sensitive panel provided by the embodiment. As illustrated in FIG. 5, the pressure detection method employing the first pressure-sensitive panel comprises the following steps S1 to S4.

S1: detecting the voltage value between the two resistors of the pressure-sensitive unit and taking the voltage value as the first voltage value when the pressure-sensitive unit is not pressed.

S2: detecting the voltage value between the two resistors and taking the voltage value as the second voltage value when the pressure-sensitive unit is pressed.

When the pressure-sensitive unit is pressed by the user, the resistors in the pressure-sensitive unit will be deformed, so that the voltage value between the two resistors can change, and hence the second voltage value is not equal to the first voltage value.

S3: calculating the difference between the first voltage value and the second voltage value.

The variation of the voltage value between the two resistors when the pressure-sensitive unit is pressed by the user (namely the difference between the first voltage value and the second voltage value) is directly proportional to the deformation of the resistors, namely in direct proportion to the pressing force of the user.

S4: determining the pressing force of the user according to the corresponding relationship between the pressing force of the user and the difference between the first voltage value and the second voltage value.

As the difference between the first voltage value and the second voltage value is directly proportional to the pressing force of the user, the pressing force of the user can be determined according to the calculated difference between the first voltage value and the second voltage value.

The pressure detection method employing the first pressure-sensitive panel, provided by the embodiment of the present disclosure, detects the voltage value between the first and second resistors according to the variation of the resistance generated by the deformation of the resistors in the pressure-sensitive unit before and after the pressing of the user, respectively obtains the first voltage value and the second voltage value, and can determine the pressing force of the user according to the corresponding relationship between the pressing force of the user and the difference between the first voltage value and the second voltage value.

Figure 6:
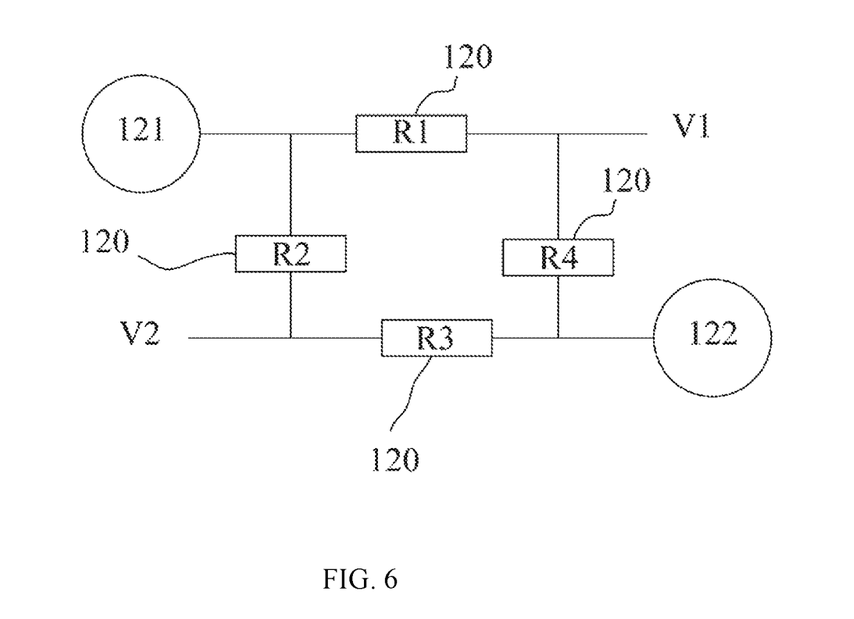
FIG. 6 is a schematic diagram of a pressure-sensitive unit in the second pressure-sensitive panel provided by the embodiment of the present disclosure.

In the embodiment of the second pressure-sensitive panel, as illustrated in FIGS. 1, 2 and 6, the pressure-sensitive panel comprises a pressure-sensitive layer 11 formed on a substrate 10. The pressure-sensitive layer 11 includes a plurality of pressure-sensitive units 12 distributed in various areas of the substrate 10. Each pressure-sensitive unit 12 includes four resistors 120. The four resistors 120 are completely the same, and each resistor 120 has long axes and short axes. Specifically, the resistor 120 may be elongated or elliptical. As illustrated in FIG. 6, when the resistor 120 is elongated, the long axis of the resistor 120 is along a direction of the long side of the elongated shape and the short axis is along a direction of the short side of the elongated shape. The resistors 120 may be made from ITO or carbon nano-material.

Of course, it should be understood by those skilled in the art that the four resistors 120 may also be not completely the same. The present disclosure is not limited thereto.

In each pressure-sensitive unit 12, the four resistors 120 are connected with each other in sequence; two short sides of the first resistor 120 are respectively connected with one long side of the second and fourth resistors 120 adjacent to the first resistor; and two short sides of the third resistor 120 opposite to the first resistor 120 are respectively connected with the other long side of the second and fourth resistors 120. It should be noted that the first, the second, the third and the fourth are only used for defining the connection order thereof and do not indicate the positional relationships thereof in physical space. A connecting end between the first and fourth resistors 120 is connected with a first fixed voltage end V1, and the voltage value of the first fixed voltage end is V1. A connecting end between the second and third resistors 120 is connected with a second fixed voltage end V2, and the voltage value of the second fixed voltage end V2 is V2. A connecting end between the first and second resistors 120 is connected with a first voltage detection unit 121, and a connecting end between the third and fourth resistors 120 is connected with a second voltage detection unit 122.

Detailed description will be given below to the working principle and the working process of the second pressure-sensitive panel provided by the present disclosure with reference to the accompanying drawings.

Figure 7:
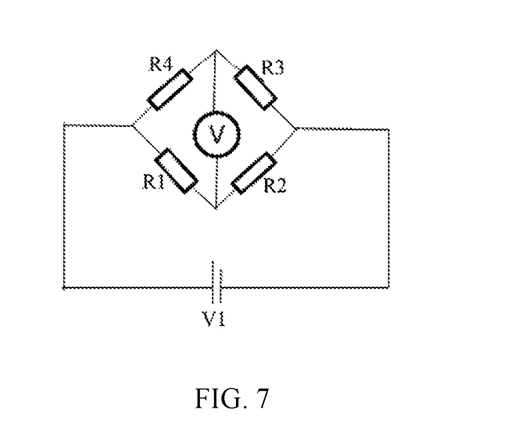
FIG. 7 is an equivalent circuit diagram of the pressure-sensitive unit as illustrated in FIG. 6 (when the second fixed voltage end is zero-voltage)

As illustrated in FIGS. 6 and 7, when the pressure-sensitive unit 12 is pressed by the user, each resistor 120 is deformed under the action of pressure, which is mainly displayed in that the long-axis direction of the resistor 120 will be longer (the short-axis direction of the resistor 120 will also be deformed, but the deformation amplitude of the short-axis direction is less than the deformation amplitude of the long-axis direction), so that the resistance between two short sides of the resistor 120 can be increased and the resistance between two long sides can be reduced. Specifically, in the embodiment, the resistance of the first and third resistors 120 will be increased and the resistance of the second and fourth resistors 120 will be reduced.

Based on the above change, supposing that the voltage value V1 of the first fixed voltage end V1 is greater than the voltage value V2 of the second fixed voltage end V2, when the pressure-sensitive unit 12 is not pressed by the user, the voltage $V_{12}$ between the first and second resistors 120 detected by the first voltage detection unit 121 is:

$$V_{12} = \frac{R1}{R1+R2} \times (V1-V2) \qquad (3)$$

wherein, R1 refers to the resistance of the first resistor 120 when the pressure-sensitive unit 12 is not pressed, and R2 refers to the resistance of the second resistor 120 when the pressure-sensitive unit 12 is not pressed.

The voltage $V_{34}$ between the third and fourth resistors 120 detected by the second detection unit 122 is:

$$V_{34} = \frac{R4}{R3+R4} \times (V1-V2) \qquad (4)$$

wherein, R3 refers to the resistance of the third resistor 120 when the pressure-sensitive unit 12 is not pressed, and R4 refers to the resistance of the fourth resistor 120 when the pressure-sensitive unit 12 is not pressed.

The four resistors 120 are the same. As the first resistor 120 is respectively connected with the second and fourth resistors 120 through two short sides thereof and the third resistor 120 is also respectively connected with the second and fourth resistors 120 through two short sides thereof, R1=R3. Similarly, as the second resistor 120 is respectively connected with the first and third resistors 120 through two long sides thereof and the fourth resistor 120 is also respectively connected with the first and third resistors 120 through two long sides thereof, R2=R4. In this case, the difference between $V_{12}$ and $V_{34}$ is:

$$V_{12} - V_{34} = \frac{R1-R2}{R1+R2} \times (V1-V2) \qquad (5)$$

When the pressure-sensitive unit 12 is pressed by the user, supposing that the resistance of the first and third resistors 120, which changes due to deformation, is converted into aR1 and aR3, a>1, and the resistance of the second and fourth resistors 120, which changes due to deformation, is converted into bR2 and bR4, b<1, the voltage $V_{12}$ between the first and second resistors 120 detected by the first detection unit 121 is converted into:

$$V_{12} = \frac{aR1}{aR1 + bR2} \times (V1 - V2) \quad (6)$$

The voltage $V_{34}$ between the third and fourth resistors 120 detected by the second detection unit 122 is:

$$V_{34} = \frac{bR4}{aR3 + bR4} \times (V1 - V2) \quad (7)$$

The difference between $V_{12}$ and $V_{34}$ is converted into:

$$V_{12} - V_{34} = \frac{aR1 - bR2}{aR1 + bR2} \times (V1 - V2) \quad (8)$$

As a>1 and b<1, it may be determined that the value $V_{12}$–$V_{34}$ after the pressing of the user is greater than the value before the pressing of the user according to the formula (8). In this case, when the pressing force of the user is larger, the deformation amplitude of the four resistors 120 is larger; a is larger and b is smaller; the value $V_{12}$–$V_{34}$ is larger after the pressing of the user according to the formula (8); and hence the difference between the value $V_{12}$–$V_{34}$ before and after the pressing of the user is larger. When the pressing force of the user is smaller, the deformation amplitude of the four resistors 120 is smaller; a is smaller and b is larger; the value $V_{12}$–$V_{34}$ is smaller after the pressing of the user according to the formula (8); and hence the difference between the value $V_{12}$–$V_{34}$ before and after the pressing of the user is smaller. Therefore, the difference between the value $V_{12}$–$V_{34}$ before and after the pressing of the user may reflect the pressing force of the user, and hence the pressing force of the user may be determined according to the variation amplitude of the value $V_{12}$–$V_{34}$ before and after the pressing of the user.

Compared with the first pressure-sensitive panel, in the embodiment, after the pressing of the user, the voltage between the first and second resistors 120 is larger and the voltage between the third and fourth resistors 120 is smaller. Thus, when the pressure-sensitive unit is pressed by the user in the same force and the deformation degree of the resistors 120 is the same, the difference between the value $V_{12}$–$V_{34}$ before and after the pressing of the user in the second pressure-sensitive panel is greater than the value $V_{12}'$–$V_{12}$ in the first pressure-sensitive panel. Therefore, the minimum limit of the pressing force of the user which can be identified by the second pressure-sensitive panel is smaller, so that the range of the pressing force of the user which can be detected by the second pressure-sensitive panel is larger, and meanwhile, the detection accuracy of the second pressure-sensitive panel is also higher.

Preferably, the second fixed voltage end V2 is a ground terminal, so that the connecting end between the third and fourth resistors 120 can be grounded, and an independent voltage terminal is not required to be provided as well, so that the number of voltage terminals required to be arranged can be reduced.

In the embodiment, the distribution density of the pressure-sensitive units 12 along the direction from the central area to the marginal area of the substrate 10 is progressively increased. The effect of the embodiment is the same with the embodiment of the first pressure-sensitive panel. No further description will be given here.

In addition, in the embodiment, in each pressure-sensitive unit 12, the distance between the resistors 120 is closer. Therefore, as similar to the first pressure-sensitive panel, the second pressure-sensitive panel in the embodiment can also obtain higher accuracy in detecting the pressing force of the user and obtain the technical effect in which the detection method and the detection process are simpler.

In the second pressure-sensitive panel provided by the embodiment of the present disclosure, in each pressure-sensitive unit 12, two branches in parallel connection formed by the first and second resistors 120 and the third and fourth resistors 120 are connected between the first fixed voltage end V1 and the second fixed voltage end V2. Moreover, in the branch provided with the first and second resistors 120, the first resistor 120 is connected between the first fixed voltage end V1 and the second fixed voltage end V2 via the long axes thereof, and the second resistor 120 are connected between the first fixed voltage end V1 and the second fixed voltage end V2 via the short axes thereof. In the branch provided with the third and fourth resistors 120, the third resistor 120 is connected between the first fixed voltage end V1 and the second fixed voltage end V2 via the short axes thereof, and the fourth resistor 120 is connected between the first fixed voltage end V1 and the second fixed voltage end V2 via the long axes thereof. Thus, when the pressure-sensitive unit 12 is pressed by the user, the voltage value between the first and second resistors 120 and the voltage value between the third and fourth resistors 120 will change in different amplitudes, and the variation amplitude of the voltage value is relevant to the pressing force of the user. Therefore, the voltage between the first and second resistors 120 is detected by the first voltage detection unit 121 and the voltage between the third and fourth resistors 120 is detected by the second voltage detection unit; the difference between both is calculated; and the pressing force of the user can be determined according to the variation of the difference before and after the pressure-sensitive unit 12 is pressed by the user.

Figure 8:
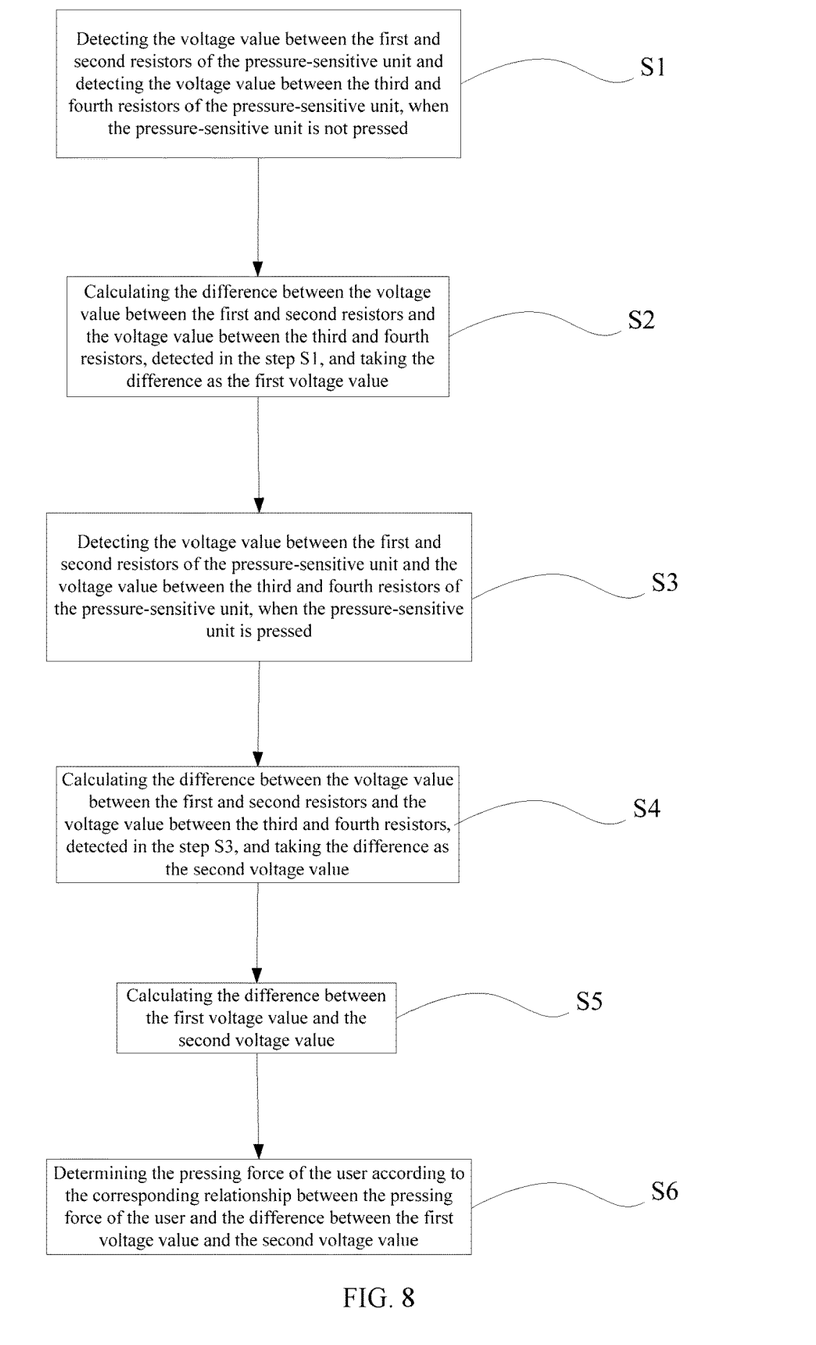
FIG. 8 is a flowchart of a pressure detection method employing the second pressure-sensitive panel provided by the embodiment of the present disclosure.

The present disclosure further provides a pressure detection method employing the second pressure-sensitive panel and provides preferred embodiments thereof. FIG. 8 is a flowchart of the pressure detection method employing the second pressure-sensitive panel provided by the present disclosure. As illustrated in FIG. 8, the pressure detection method employing the second pressure-sensitive panel comprises the following steps S1 to S6.

S1: detecting the voltage value between the first and second resistors of the pressure-sensitive unit and detecting the voltage value between the third and fourth resistors of the pressure-sensitive unit, when the pressure-sensitive unit is not pressed.

S2: calculating the difference between the voltage value between the first and second resistors and the voltage value between the third and fourth resistors, detected in the step S1, and taking the difference as the first voltage value.

S3: detecting the voltage value between the first and second resistors of the pressure-sensitive unit and the voltage value between the third and fourth resistors of the pressure-sensitive unit, when the pressure-sensitive unit is pressed.

When the pressure-sensitive unit is pressed by the user, the resistors in the pressure-sensitive unit will be deformed. Moreover, the voltage value between the first and second resistors and the voltage value between the third and fourth resistors have opposite variation tendency, in which one of both is larger and the other is smaller.

S4: calculating the difference between the voltage value between the first and second resistors and the voltage value between the third and fourth resistors, detected in the step S3, and taking the difference as the second voltage value.

As one of the voltage value between the first and second resistors and the voltage value between the third and fourth resistors is larger and the other is smaller, the variation of the difference between both, namely the difference between the second voltage value and the first voltage value, is directly proportional to the pressuring force of the user.

S5: calculating the difference between the first voltage value and the second voltage value.

S6: determining the pressing force of the user according to the corresponding relationship between the pressing force of the user and the difference between the first voltage value and the second voltage value.

As the difference between the first voltage value and the second voltage value is in direct proportion to the pressing force of the user, the pressing force of the user may be determined according to the calculated difference between the first voltage value and the second voltage value.

The pressure detection method employing the second pressure-sensitive panel, provided by the present disclosure, detects the voltage value between the first and second resistors and the voltage value between the third and fourth resistors before and after the pressing of the user according to the variation of the resistance generated by the deformation of the resistors in the pressure-sensitive unit before and after the pressing of the user, calculates the difference between the voltage value before and after the pressing of the user, respectively obtains the first voltage value and the second voltage value, and can determine the pressing force of the user according to the corresponding relationship between the pressing force of the user and the difference between the first voltage value and the second voltage value.

The present disclosure further provides a 3D touch panel. In the embodiment, the 3D touch panel comprises the first or second pressure-sensitive panel provided by the embodiments of the present disclosure.

The 3D touch panel provided by the present disclosure adopts the first or second pressure-sensitive panel provided by the present disclosure and can detect the pressing force of the user in touch operation.

The present disclosure further provides a touch display panel. In the embodiment, the touch display panel comprises the 3D touch panel provided by the embodiment of the present disclosure or adopts the first or second pressure-sensitive panel provided by the present disclosure.

The touch display panel provided by the present disclosure adopts the 3D touch panel provided by the embodiment of the present disclosure or adopts the first or second pressure-sensitive panel provided by the present disclosure, can detect the pressing force of the user in touch operation and respond to corresponding operation according to the pressing force of the user, and hence can provide richer touch experience.

Specifically, the touch display panel may be a liquid crystal display (LCD) panel or an active-matrix organic light-emitting diode (AMOLED) display panel. Taking the LCD as an example, as illustrated in FIG. 9, the touch display panel comprises an array substrate 20, a counter substrate 21 in cell-assembly with the array substrate 20, a liquid crystal layer 22 disposed between the array substrate 20 and the counter substrate 21, and the pressure-sensitive panel provided by the embodiment of the present disclosure.

The pressure-sensitive layer 11 of the pressure-sensitive panel is formed on the array substrate 20 or the counter substrate 21.

Figure 9:
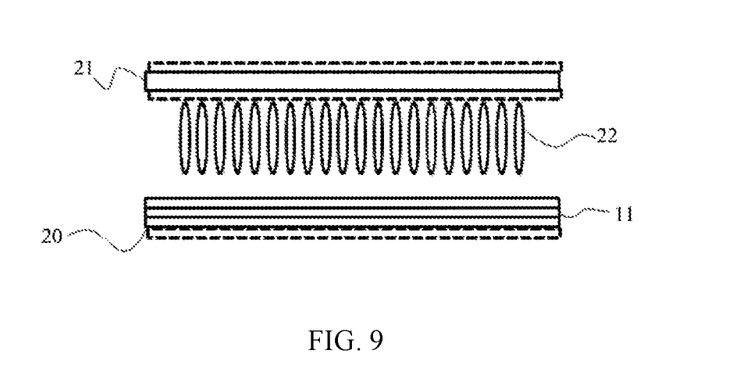
FIG. 9 is a schematic diagram of the setting modes of the pressure-sensitive panel provided by the embodiment of the present disclosure.

Specifically, as illustrated in FIG. 9, the pressure-sensitive layer 11 may be specifically formed on one side of the array substrate 20 facing the counter substrate 21 or one side of the counter substrate 21 facing the array substrate 20 (indicated by the second dotted line from the top down in the figure). At this point, the pressure-sensitive panel is disposed in the touch display panel to form in-cell touch. In addition, the pressure-sensitive layer 11 may also be formed on a light-emitting side of the counter substrate 21 (indicated by the first dotted line from the top down in the figure), or a light-incident side of the array substrate 20 (indicated by the third dotted line from the top down in the figure).

It should be understood that the above embodiments are only preferred embodiments adopted for illustrating the principle of the present disclosure and not intended to limit the present disclosure. Various modifications and improvements may be made by those skilled in the art without departing from the spirit and the essence of the present disclosure and shall also fall within the scope of protection of the present disclosure.

The invention claimed is:

1. A pressure-sensitive panel, comprising: a pressure-sensitive layer formed on a substrate, wherein the pressure-sensitive layer includes a plurality of pressure-sensitive units distributed in various areas of the substrate; each pressure-sensitive unit includes two resistors and a first voltage detection unit, wherein the two resistors comprise a first resistor and a second resistor;

each of the two resistors is provided with a long axis and a short axis;

in each pressure-sensitive unit, two short sides of the first resistor are respectively connected with a first fixed voltage end and one long side of the second resistor; the other long side of the second resistor is connected with a second fixed voltage end;

the first voltage detection unit is connected with a connecting end between the first resistor and the second resistor and configured to detect a voltage at the connecting end between the first resistor and the second resistor; and a direction of a current flowing from the first fixed voltage end to the second fixed voltage end is along the long axis of the first resistor, and the direction of the current is along the short axis of the second resistor.

2. The pressure-sensitive panel according to claim 1, wherein the two resistors are elongated or elliptical.

3. The pressure-sensitive panel according to claim 1, wherein the second fixed voltage end is a ground terminal.

4. The pressure-sensitive panel according to claim 1, wherein a distribution density of the pressure-sensitive units along a direction from a central area to a marginal area of the substrate is progressively increased.

5. The pressure-sensitive panel according to claim 1, wherein the two resistors are made from indium tin oxide (ITO) or carbon nano-material.

6. A pressure detection method employing the pressure-sensitive panel according to claim 1, comprising:

detecting a voltage value between the two resistors of the pressure-sensitive unit and taking the voltage value as a first voltage value, upon the pressure-sensitive unit being not pressed;

detecting the voltage value between the two resistors and taking the voltage value as a second voltage value, upon the pressure-sensitive unit being pressed;

calculating a difference between the first voltage value and the second voltage value; and determining a pressing force of a user according to a corresponding relationship between the pressing force of the user and the difference between the first voltage value and the second voltage value.

7. A pressure-sensitive panel, comprising: a pressure-sensitive layer formed on a substrate, wherein the pressure-sensitive layer includes a plurality of pressure-sensitive units distributed in various areas of the substrate; each pressure-sensitive unit includes four resistors, a first voltage detection unit, and a second voltage detection unit, wherein the four resistors comprise a first resistor, a second resistor, a third resistor and fourth resistor;

each of the four resistors is provided with a long axis and a short axis; the four resistors are connected with each other in sequence; two short sides of the first resistor are respectively connected with one long side of the second resistor and the fourth resistor adjacent to the first resistor; two short sides of the third resistor opposite to the first resistor are respectively connected with the other long side of the second resistor and the fourth resistor;

a connecting end between the first resistor and the fourth resistor is connected with a first fixed voltage end; a connecting end between the second resistor and the third resistor is connected with a second fixed voltage end;

the first voltage detection unit is connected with a connecting end between the first resistor and the second resistor and configured to detect a voltage at the connecting end between the first resistor and the second resistor;

the second voltage detection unit is connected with a connecting end between the third resistor and the fourth resistor and configured to detect a voltage at the connecting end between the third resistor and the fourth resistor; and a direction of a current flowing from the first fixed voltage end to the second fixed voltage end is along the long axis of the firs resistor and the third resistor, and the direction of the current is along the short axis of the second resistor and the fourth resistor.

8. The pressure-sensitive panel according to claim 7, wherein the four resistors are elongated or elliptical.

9. The pressure-sensitive panel according to claim 7, wherein the second fixed voltage end is a ground terminal.

10. The pressure-sensitive panel according to claim 7, wherein a distribution density of the pressure-sensitive units along a direction from a central area to a marginal area of the substrate is progressively increased.

11. The pressure-sensitive panel according to claim 7, wherein the four resistors are made from ITO or carbon nano-material.

12. A pressure detection method employing the pressure-sensitive panel according to claim 7, comprising:

detecting a voltage value between the first resistor and the second resistor of the pressure-sensitive unit and detecting a voltage value between the third resistor and the fourth resistor of the pressure-sensitive unit, upon the pressure-sensitive unit being not pressed;

calculating a difference between the detected voltage value between the first resistor and the second resistor and the detected voltage value between the third resistor and the fourth resistor, and taking the difference as a first voltage value;

detecting the voltage value between the first resistor and the second resistor of the pressure-sensitive unit and detecting the voltage value between the third resistor and the fourth resistor of the pressure-sensitive unit, upon the pressure-sensitive unit being pressed;

calculating a difference between the detected voltage value between the first resistor and the second resistor and the detected voltage value between the third resistor and the fourth resistor, and taking the difference as a second voltage value;

calculating the difference between the first voltage value and the second voltage value; and determining a pressing force of a user according to a corresponding relationship between the pressing force of the user and the difference between the first voltage value and the second voltage value.

13. A 3D touch panel, comprising: the pressure-sensitive panel according to claim 1.

14. A touch display panel, comprising: the pressure-sensitive panel according to claim 1.

15. A touch display panel, comprising: the 3D touch panel according to claim 13.

16. A 3D touch panel, comprising: the pressure-sensitive panel according to claim 7.

17. A touch display panel, comprising: the pressure-sensitive panel according to claim 7.

18. The pressure-sensitive panel according to claim 2, wherein the second fixed voltage end is a ground terminal.

19. The pressure-sensitive panel according to claim 2, wherein a distribution density of the pressure-sensitive units along a direction from a central area to a marginal area of the substrate is progressively increased.

20. The pressure-sensitive panel according to claim 8, wherein the second fixed voltage end is a ground terminal.

* * * * *